United States Patent
Fleming

(10) Patent No.: US 11,298,914 B2
(45) Date of Patent: Apr. 12, 2022

(54) APPARATUS AND METHODS FOR FABRICATING TOTE BAGS

(71) Applicant: Freedom Corp, Morrison, CO (US)

(72) Inventor: Paul Fleming, Morrison, CO (US)

(73) Assignee: Freedom Corp, Littleton, CO (US)

( * ) Notice: Subject to any disclaimer, the term of this patent is extended or adjusted under 35 U.S.C. 154(b) by 170 days.

(21) Appl. No.: 16/695,275

(22) Filed: Nov. 26, 2019

(65) Prior Publication Data

US 2020/0164612 A1  May 28, 2020

Related U.S. Application Data

(60) Provisional application No. 62/797,291, filed on Jan. 27, 2019, provisional application No. 62/771,216, filed on Nov. 26, 2018.

(51) Int. Cl.
| | |
|---|---|
| *B32B 5/00* | (2006.01) |
| *B32B 27/00* | (2006.01) |
| *B41M 5/00* | (2006.01) |
| *D06P 5/00* | (2006.01) |
| *B32B 5/02* | (2006.01) |

(Continued)

(52) U.S. Cl.
CPC .............. *B32B 5/022* (2013.01); *B32B 27/32* (2013.01); *B41M 5/0064* (2013.01); *B41M 5/035* (2013.01); *B65D 29/02* (2013.01); *D06P 5/004* (2013.01); *B29C 65/02* (2013.01); *B29C 65/08* (2013.01); *B29C 65/081* (2013.01); *B29C 65/082* (2013.01); *B29C 2795/002* (2013.01); *B32B 38/145* (2013.01); *B32B 2262/0284* (2013.01); *B32B 2310/028* (2013.01); *B41F 5/00* (2013.01); *B41F 5/24* (2013.01); *B41F 17/00* (2013.01); *B41F 17/002* (2013.01); *B41M 1/04* (2013.01); *B41M 5/52* (2013.01); *B65D 65/40* (2013.01)

(58) Field of Classification Search
CPC .. B32B 5/00; B32B 5/02; B32B 5/022; B32B 27/00; B32B 27/30; B32B 27/32; B41M 5/00; B41M 5/006; B41M 5/0064; B41M 5/03; B41M 5/035; B65D 29/00; B65D 29/02; D06P 5/00; D06P 5/004

See application file for complete search history.

(56) References Cited

U.S. PATENT DOCUMENTS

| | | | | |
|---|---|---|---|---|
| 2014/0105523 A1* | 4/2014 | Bazbaz | ............... | B65D 33/1683 383/210 |
| 2015/0266644 A1* | 9/2015 | Bazbaz | .................. | B32B 27/00 383/201 |
| 2018/0072463 A1* | 3/2018 | Han | ........................ | B32B 27/12 |

* cited by examiner

*Primary Examiner* — Jacob T Minskey
*Assistant Examiner* — Matthew Hoover
(74) *Attorney, Agent, or Firm* — Kasha Law LLC; John R. Kasha; Kelly L. Kasha

(57) ABSTRACT

In one method, a piece of nonwoven PET or PP fabric is formed into a tote bag using a bag forming device. Seams of the tote bag are ultrasonically welded using an ultrasonic bag welding device. The ultrasonic bag welding device includes at least one sonotrode. In another method, BOPP film is received and a full-color graphic is printed on the BOPP film for each tote bag using a printer. The printed BOPP film is received from the printer and nonwoven PP or PET fabric is received from a roll of nonwoven PP or PET fabric using a laminator. The printed BOPP film is laminated to the nonwoven PP or PET fabric. The printed BOPP film laminated to nonwoven PP or PET fabric is received from the laminator and a finished version of each tote bag is produced using an ultrasonic bag welding device.

20 Claims, 17 Drawing Sheets

(51) Int. Cl.
  *D06P 5/28*   (2006.01)
  *B32B 27/32*   (2006.01)
  *B65D 30/08*   (2006.01)
  *B41M 5/035*   (2006.01)
  *B65D 65/40*   (2006.01)
  *B41M 5/52*   (2006.01)
  *B41F 17/00*   (2006.01)
  *B32B 38/00*   (2006.01)
  *B29C 65/08*   (2006.01)
  *B41M 1/04*   (2006.01)
  *B41F 5/24*   (2006.01)
  *B29C 65/02*   (2006.01)
  *B41F 5/00*   (2006.01)

APPARATUS AND METHODS FOR FABRICATING TOTE BAGS

CROSS-REFERENCE TO RELATED APPLICATION

This application claims the benefit of U.S. Provisional Patent Application Ser. No. 62/771,216, filed Nov. 26, 2018, and U.S. Provisional Patent Application Ser. No. 62/797,291, filed Jan. 27, 2019, the contents of which are incorporated by reference herein in their entireties.

INTRODUCTION

The teachings herein relate to apparatus and methods for manufacturing tote bags from nonwoven fabric. More specifically, apparatus for manufacturing tote bags from nonwoven polyethylene terephthalate (PET) fabric includes an ultrasonic bag welding device that ultrasonically welds seams and handles of tote bags using sonotrodes capable of reaching the melting point of nonwoven PET fabric. Promotional information is printed directly on nonwoven PET fabric tote bags using dye sublimation. In addition, a method for manufacturing tote bags includes laminating biaxially oriented polypropylene (BOPP) film to nonwoven polypropylene (PP) or PET fabric. Branding or promotional information is printed on the BOPP film.

Reusable Shopping Bags

Reusable shopping bags are becoming increasingly popular as a replacement for single-use or disposable plastic bags. Reusable shopping bags are now commonly used to transport groceries from a grocery store, for example. Reusable shopping bags often come in the form of a tote bag. A tote bag is typically an unfastened pouch with parallel handles. A tote bag can be made of almost any type of material but is usually made of fabric or plastic.

FIG. 1 is an exemplary diagram 100 of a gusseted tote bag. The tote bag of FIG. 1, includes front 110, back 120, gusseted sides 130 and 140, handles 150 and 160, and bottom 170. Front 110, back 120, gusseted sides 130 and 140, and bottom 170 can be formed from a single sheet of fabric, for example. The bag is created by sewing seams of gusseted sides 130 and 140 and sewing handles 150 and 160 to front 110 and back 120, respectively. A gusset is, for example, extra fabric that makes a bag roomier and stronger. If bottom 170 is also gusseted, the tote bag of FIG. 1 can be referred to as an all side gusset tote bag. Other types of tote bags include, but are not limited to, flat tote bags and bottom gusset tote bags.

Promotional Tote Bags

Tote bags are now so widely used that they have become an ideal vehicle for branding or promotional information. For example, businesses use them to display advertising, their brand names, or logos. This promotional use of tote bags has placed at least three interrelated constraints on the manufacture of tote bags. First, there is a need to increase the bag production rate at a lower cost. Second, there is a need to increase the quality of the promotional information placed on the bags. Finally, there is a need to both increase their production rate at a lower cost and increase the quality of the promotional information placed on the bags while producing just a small number of bags, for smaller businesses or special events.

One method of addressing the first constraint has been to lower the cost of attaching the handles of the tote bag and sealing the seams of the tote bag. Traditionally, attaching the handles and sealing the seams has been performed by stitching or sewing the fabric. More recently, the speed of these tasks has been increased and the cost lowered by ultrasonically welding the handles and ultrasonically welding the seams of a tote bag.

It is possible to ultrasonically weld the handles and the seams of a tote bag made of a nonwoven fabric. INDA, Association of the Nonwoven fabrics industry, has defined nonwoven fabrics as: " . . . as sheet or web structures bonded together by entangling fiber or filaments (and by perforating films) mechanically, thermally, or chemically. They are flat, porous sheets that are made directly from separate fibers or from molten plastic or plastic film. They are not made by weaving or knitting and do not require converting the fibers to yarn."

Specifically, ultrasonic tote bag making machines have been developed to automatically make tote bags at a rate of about one bag per second using nonwoven polypropylene (PP) fabric. These machines cut, fold, and weld the fabric, performing the previous functions of up to 50 textile workers, for example.

FIG. 2 is an exemplary top view diagram 200 of an ultrasonic tote bag manufacturing machine that is used to manufacture tote bags from nonwoven PP fabric. Feeding device 220 feeds and cuts nonwoven PP fabric from nonwoven PP fabric roll 210. Handle forming and sealing device 230 folds and then attaches two handles to each tote bag. Handle forming and sealing device 230 folds and attaches the handles to each tote bag using one or more ultrasonic devices 235 that weld each handle to each tote bag.

One or more ultrasonic devices 235 are sonotrodes, for example. Each sonotrode includes a piezoelectric transducer 236 and a tapered metal end or horn 237. Piezoelectric transducer 236, for example, produces vibrational energy that is applied to a fabric (not shown) through tapered metal end 237 that is placed on the fabric. Tapered metal end 237 is placed on the fabric using a certain clamping force or pressure. In order to achieve a specific weld temperature, a sonotrode is designed and then controlled to have a specific weld time, frequency, amplitude, and pressure.

Mainframe 240 stores and can fold each tote bag. Tote bags are stored or buffered, for example, to maintain a high manufacturing rate. Mainframe 240 also houses a control computer and motor. The control computer can be a controller, a microprocessor, the computer system of FIG. 3, or any device capable of sending and receiving control signals and processing data.

Bag forming device 250 forms the sides, bottom, or sides and bottom of each tote bag creating the side, bottom, or side and bottom seams. Side gusset tote bags, flat tote bags, or bottom gusset tote bags can be manufactured, for example. Ultrasonic bag welding device 260 ultrasonically welds the seams of each tote bag using one or more ultrasonic devices 265. Finally, collecting device 270 collects each finished tote bag.

Using the ultrasonic tote bag making machine of FIG. 2 and nonwoven PP fabric, tote bags can be made at a high production rate and low cost. Unfortunately, however, high-quality promotional information cannot be placed on tote bags made of nonwoven PP fabric. Text may be printed on this material but not high-quality and colorful images. In addition, it is difficult to print promotional information in small batches on this material. As a result, two of the three constraints described above for the promotional use of tote bags cannot be met with nonwoven PP fabric. In addition, there is currently promotional value in including recycled material in the manufacture of tote bags.

Consequently, there is a need for apparatus and methods that can manufacture tote bags with high-quality promotional information printed on them, that can manufacture these tote bags in small batches, and can include recycled material in the fabric used, while at the same time maintaining a high production rate and low cost.

SUMMARY

Apparatus and methods are disclosed for manufacturing tote bags from nonwoven polyethylene terephthalate (PET) fabric. The apparatus includes a bag forming device and an ultrasonic bag welding device.

The bag forming device forms at least one piece of nonwoven PET fabric into at least one tote bag. The ultrasonic bag welding device then ultrasonically welds at least one seam of the at least one tote bag. The ultrasonic bag welding device uses at least one sonotrode operated to produce a frequency greater than or equal to 20 kHz and a pressure greater than or equal to 2,500 N.

Apparatus and methods are also disclosed for manufacturing full-color graphic printed tote bags made from biaxially oriented polypropylene BOPP) film laminated to spunbond nonwoven polypropylene (PP) or PET fabric in one process. In these embodiments, at least one full-color graphic is printed on the BOPP film before it is laminated to the nonwoven PP or PET fabric. The apparatus includes a printer, a laminator, and an ultrasonic bag welding device.

The printer receives BOPP film from a roll of BOPP film and prints at least one full-color graphic on the BOPP film for each of a plurality of tote bags. The laminator receives the printed BOPP film and simultaneously receives nonwoven PP or PET fabric from a roll of nonwoven PP or PET fabric, and laminates the printed BOPP film to the nonwoven PP or PET fabric as the printed BOPP film. The ultrasonic bag welding device receives the printed BOPP film laminated to nonwoven PP or PET fabric finished version of each of the plurality of tote bags. The ultrasonic bag welding device produces the finished version by cutting the printed BOPP film laminated to nonwoven PP or PET fabric for each tote bag, cutting part of the printed BOPP film laminated to nonwoven PP or PET fabric for handles for each tote bag, ultrasonically welding the handles to each tote bag, forming each tote bag, and ultrasonically welding together seams for each tote bag.

Apparatus and methods are also disclosed for manufacturing full-color graphic printed tote bags made from BOPP film laminated to nonwoven PP or PET fabric in which at least one full-color graphic is printed on the BOPP film after it is laminated to the nonwoven PP or PET fabric. The apparatus includes a laminator, a printer, and an ultrasonic bag welding device.

The laminator receives printed BOPP film from a roll of BOPP film, receives nonwoven PP or PET fabric from a roll of nonwoven PP or PET fabric, and laminates the printed BOPP film to the nonwoven PP or PET fabric as the BOPP film is received from the roll of BOPP film. The printer receives the BOPP film and prints at least one full-color graphic on the BOPP film for each of a plurality of tote bags. The ultrasonic bag welding device receives the printed BOPP film laminated to nonwoven PP or PET fabric and produces a finished version of each of the plurality of tote bags. The ultrasonic bag welding device produces a finished version by cutting the printed BOPP film laminated to nonwoven PP or PET fabric for each tote bag, cutting part of the printed BOPP film laminated to nonwoven PP or PET fabric for handles for each tote bag, ultrasonically welding the handles to each tote bag, forming each tote bag, and ultrasonically welding together seams for each tote bag.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
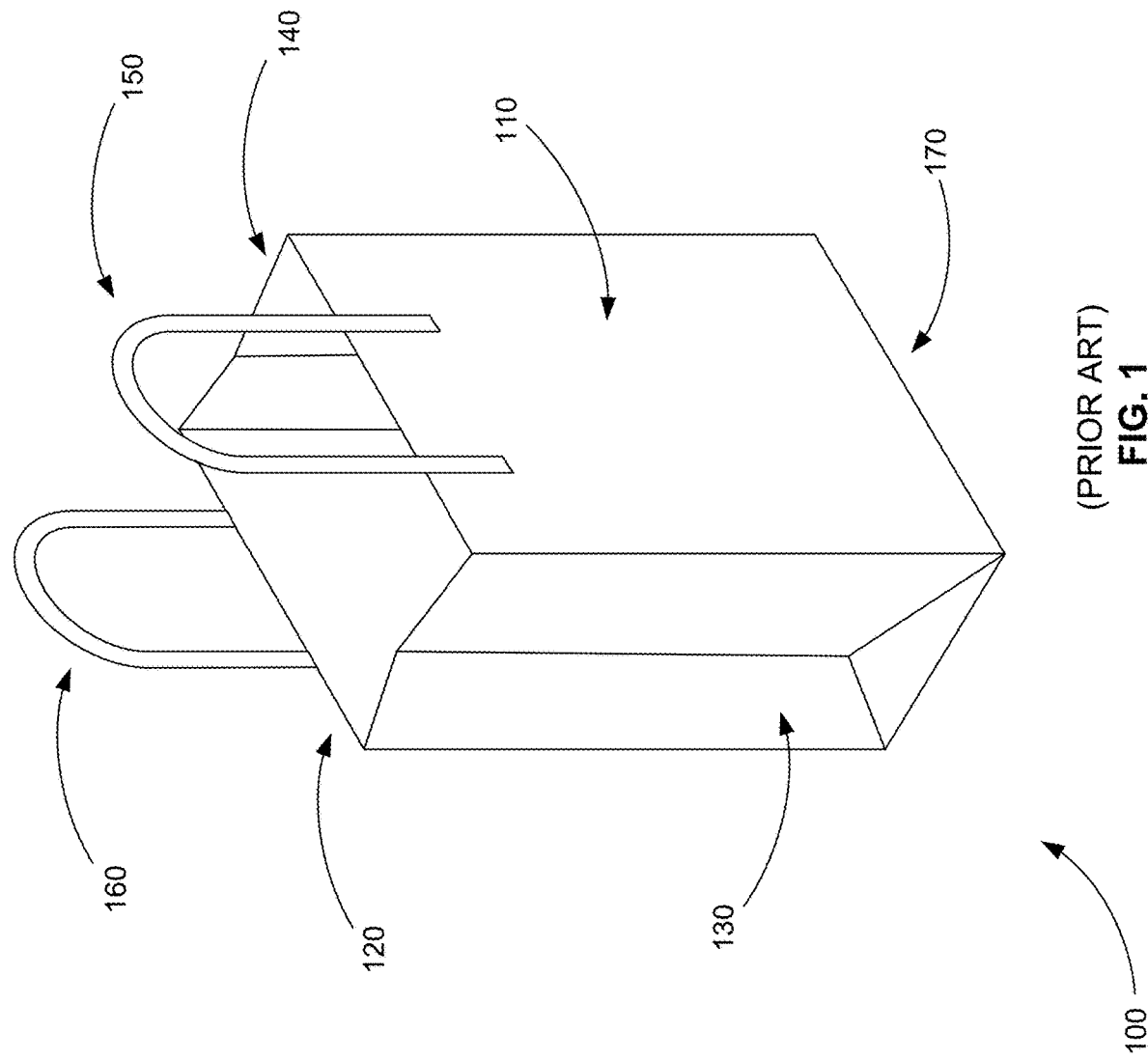
FIG. 1 is an exemplary diagram of a gusseted tote bag.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

Figure 3:
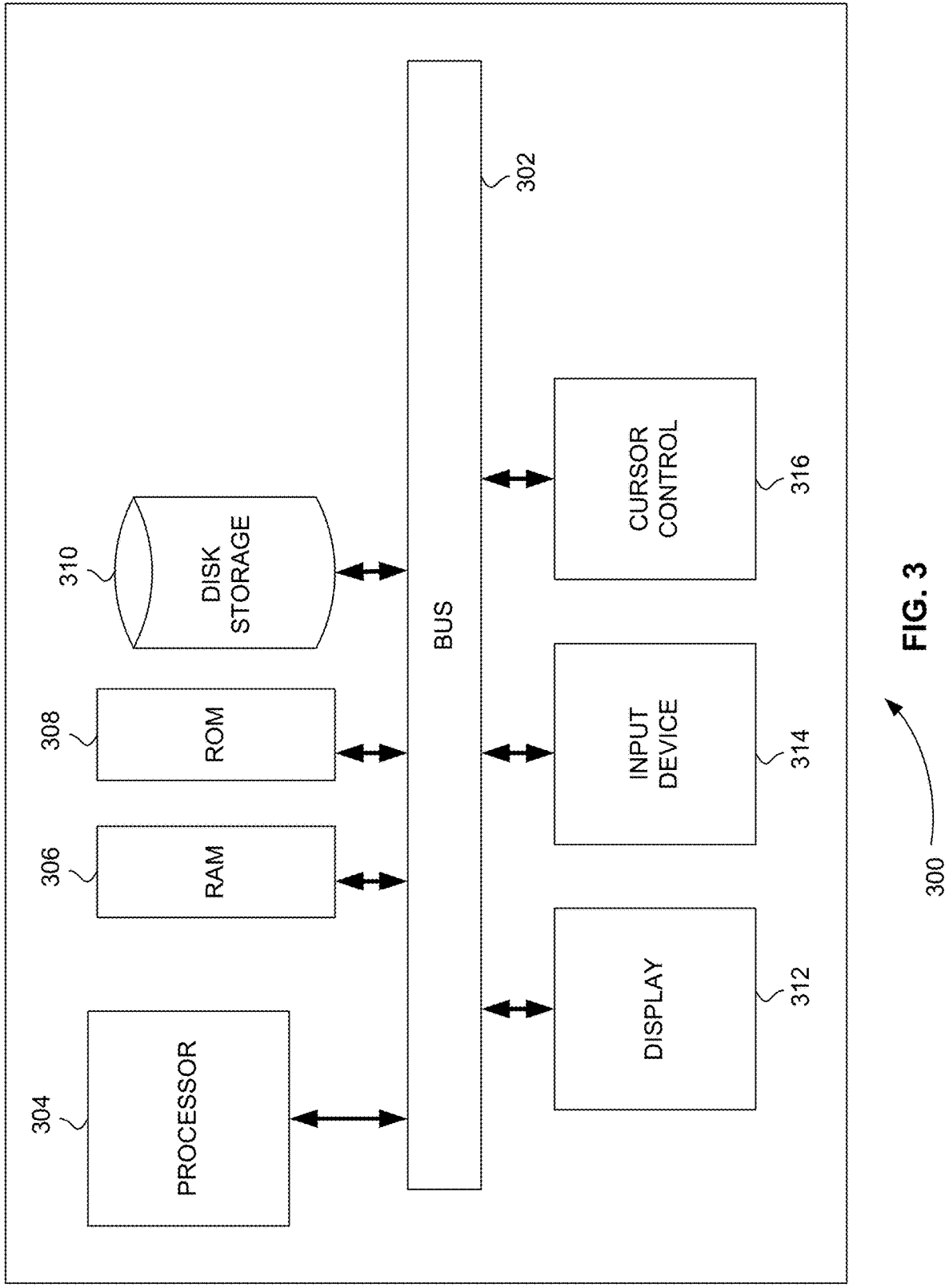
FIG. 3 is a block diagram that illustrates a computer system, upon which embodiments of the present teachings may be implemented.

FIG. 3 is a block diagram that illustrates a computer system 300, upon which embodiments of the present teachings may be implemented. Computer system 300 includes a bus 302 or other communication mechanism for communicating information, and a processor 304 coupled with bus 302 for processing information. Computer system 300 also includes a memory 306, which can be a random-access memory (RAM) or other dynamic storage device, coupled to bus 302 for storing instructions to be executed by processor 304. Memory 306 also may be used for storing temporary variables or other intermediate information during execution of instructions to be executed by processor 304. Computer system 300 further includes a read-only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT) or liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball or cursor direction keys for communicating direction information and command selections to processor 304 and for controlling cursor movement on display 312. This input device typically has two degrees of freedom in two axes, a first axis (i.e., x) and a second axis (i.e., y), that allows the device to specify positions in a plane.

A computer system 300 can perform the present teachings. Consistent with certain implementations of the present teachings, results are provided by computer system 300 in response to processor 304 executing one or more sequences of one or more instructions contained in memory 306. Such instructions may be read into memory 306 from another computer-readable medium, such as storage device 310. Execution of the sequences of instructions contained in memory 306 causes processor 304 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 300 can be connected to one or more other computer systems, like computer system 300, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as memory 306. Transmission media includes coaxial cables, copper wire, and fiber optics, including the wires that comprise bus 302.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 304 for execution. For example, the instructions may initially be carried on the magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector coupled to bus 302 can receive the data carried in the infra-red signal and place the data on bus 302. Bus 302 carries the data to memory 306, from which processor 304 retrieves and executes the instructions. The instructions received by memory 306 may optionally be stored on storage device 310 either before or after execution by processor 304.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Manufacture of PET or PP Tote Bags

As described above, reusable shopping bags are becoming increasingly popular as a replacement for single-use or disposable plastic bags. Reusable shopping bags often come in the form of a tote bag. Tote bags are now so widely used that they have become an ideal vehicle for promotional or branding information.

This promotional use of tote bags has placed at least three interrelated constraints on the manufacture of tote bags. First, there is a need to increase the bag production rate at a lower cost. Second, there is a need to increase the quality of the promotional information placed on the bags. Finally, there is a need to both increase their production rate at a lower cost and increase the quality of the promotional information placed on the bags while producing just a small number of bags, for smaller businesses and special events.

One method of addressing the first constraint has been to lower the cost of attaching the handles of the tote bag and sealing the seams of the tote bag by ultrasonically welding them. Specifically, ultrasonic tote bag making machines have been developed to automatically make tote bags at a rate of about one bag per second using nonwoven polypropylene (PP) fabric.

Unfortunately, however, high-quality promotional information cannot be placed on tote bags made of nonwoven PP fabric and it is difficult to apply different promotional information in small batches on this material. In addition, recycled material cannot be included in nonwoven PP fabric.

Consequently, there is a need for apparatus and methods that can manufacture tote bags with high-quality promotional information printed on them, that can manufacture these tote bags in small batches, and can include recycled material in the fabric used, while at the same time maintaining a high production rate and low cost.

In various embodiments, nonwoven polyethylene terephthalate (PET) fabric is used to manufacture tote bags. Nonwoven PET fabric is currently about 20% more expensive than nonwoven PP fabric. However, high-quality promotional information can be printed directly on nonwoven PET fabric, nonwoven PET fabric tote bags with high-quality promotional information can be manufactured in small batches, and nonwoven PET fabric can include recycled material.

One skilled in the art can appreciate that there are currently at least three methods for printing high-quality promotional information on tote bags. These methods are silkscreening, transfer printing, flexographic printing, which requires film lamination, and dye sublimation. Of these three methods, dye sublimation is particularly well-suited to apply high-quality promotional information in small batches.

This is because dye sublimation is a digital printing technology where a print head applies sublimation dyes that are transferred to a fabric substrate through heat-induced sublimation. To change the promotional information, the print head simply needs to print a different image. In contrast, silkscreening and flexographic printing require a different stencil or print plate, respectively, each time the promotional information changes.

Dye sublimation works well with nonwoven PET fabric. In contrast, dye sublimation cannot be applied directly to nonwoven PP fabric.

Figure 4:
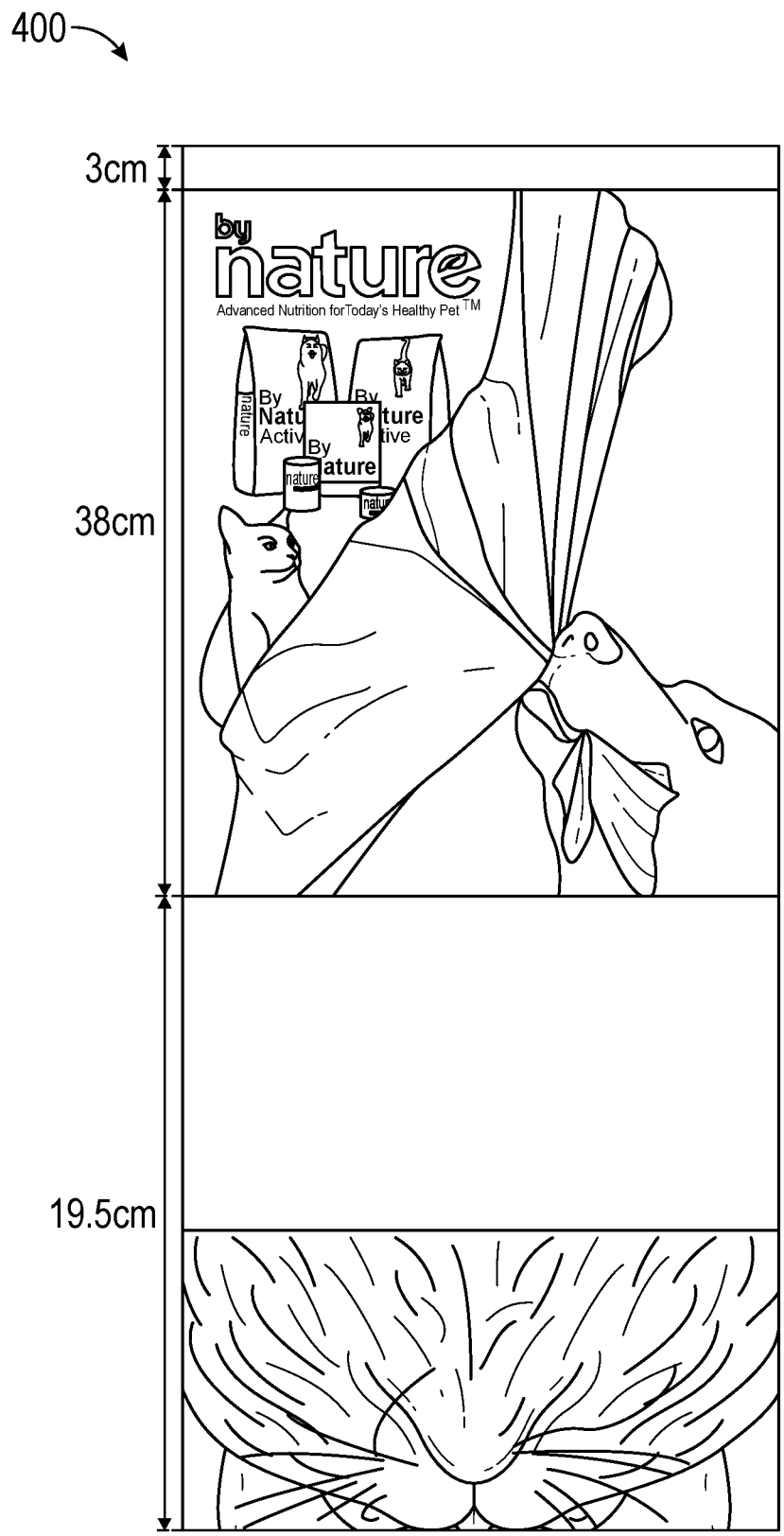
FIG. 4 is an exemplary diagram showing a portion of a promotional digital image printed on nonwoven polyethylene terephthalate (PET) fabric using dye sublimation for the front, bottom, and back of a tote bag and showing the dimensions of the front and bottom of the tote bag, in accordance with various embodiments.

FIG. 4 is an exemplary diagram 400 showing a portion of a promotional digital image printed on nonwoven PET fabric using dye sublimation for the front, bottom, and back of a tote bag and showing the dimensions of the front and bottom of the tote bag, in accordance with various embodiments. FIG. 4 is illustrative of the type of high-quality image that can be printed on PET fabric using dye sublimation. The image of FIG. 4 is shown in black and white, but dye sublimation is capable of producing rich and vibrant colors. Note that one sheet of nonwoven PET fabric is being used for the front, bottom, and back of the tote bag.

Figure 5:
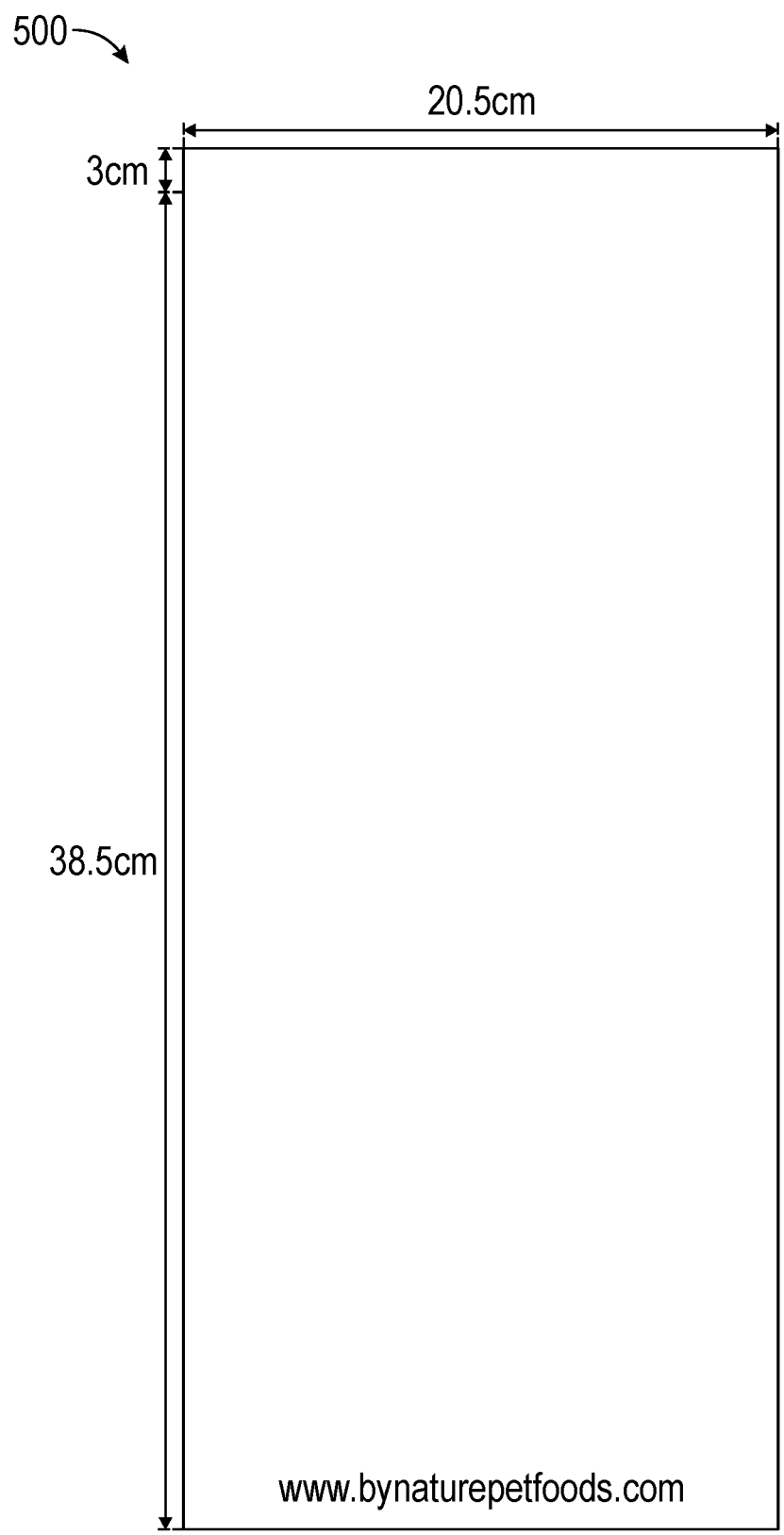
FIG. 5 is an exemplary diagram showing a promotional digital image printed on nonwoven PET fabric using dye sublimation for a five-layer gusset for a side of a tote bag and showing the dimensions of the side of the tote bag, in accordance with various embodiments.

FIG. 5 is an exemplary diagram 500 showing a promotional digital image printed on nonwoven PET fabric using dye sublimation for a five-layer gusset for a side of a tote bag and showing the dimensions of the side of the tote bag, in accordance with various embodiments.

Figure 6:
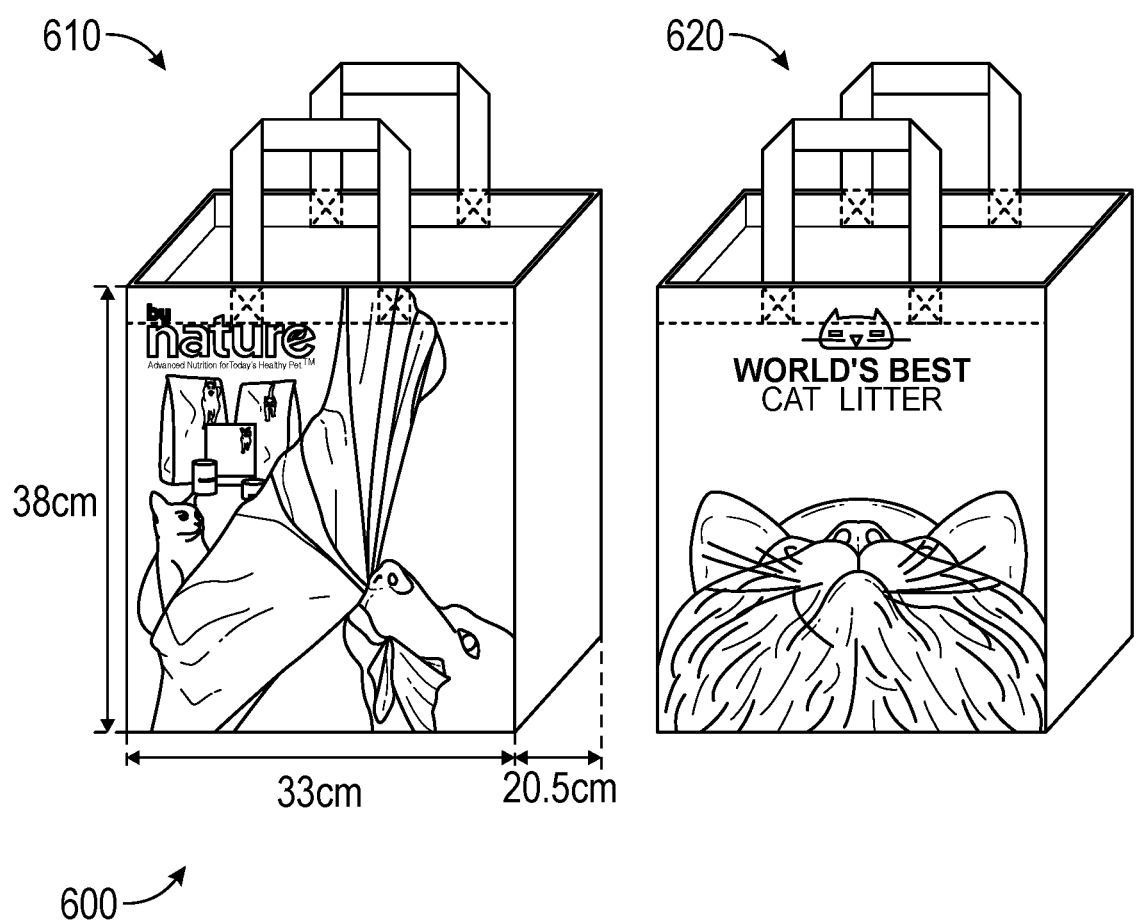
FIG. 6 is an exemplary diagram showing two views of a finished nonwoven PET tote bag printed with the promotional digital images of FIGS. 4 and 5, in accordance with various embodiments.

FIG. 6 is an exemplary diagram 600 showing two views of a finished nonwoven PET tote bag printed with the promotional digital images of FIGS. 4 and 5, in accordance with various embodiments. View 610 shows the front of the finished tote bag and a side of the tote bag. View 620 shows the back of the finished tote bag and the other side of the tote bag.

In addition to having a higher cost than nonwoven PP fabric, nonwoven PET fabric has a higher melting point, 260 C, than nonwoven PP fabric. As a result, the sonotrodes of the ultrasonic tote bag making machine of FIG. 2 cannot be used to ultrasonically weld nonwoven PET fabric. Prior to the embodiments described herein, it was not even thought possible, because of its higher melting point, or desirable, because of its higher cost, to ultrasonically weld nonwoven PET fabric in an ultrasonic tote bag manufacturing machine.

In various embodiments, one or more sonotrodes are operated with a frequency greater than or equal to 20 kHz and pressure greater than or equal to 2,500 N to ultrasonically weld nonwoven PET fabric.

Figure 7:
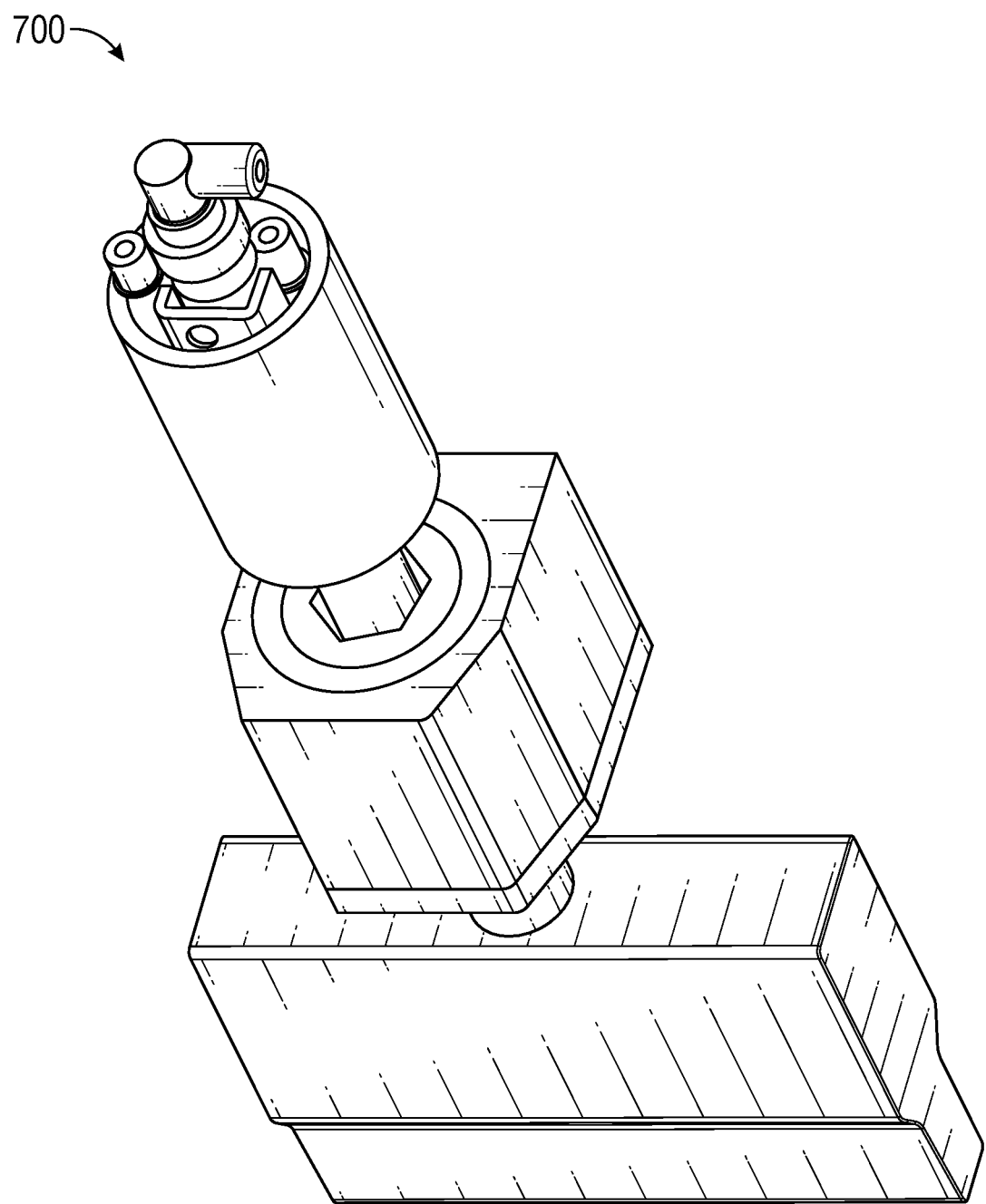
FIG. 7 is an exemplary diagram of a sonotrode capable of being operated with a frequency greater than or equal to 20 kHz and pressure greater than or equal to 2,500 N in order to ultrasonically weld nonwoven PET fabric accordance with various embodiments.

FIG. 7 is an exemplary diagram 700 of a sonotrode capable of being operated with a frequency greater than or equal to 20 kHz and pressure greater than or equal to 2,500 N in order to ultrasonically weld nonwoven PET fabric, in accordance with various embodiments. Such a sonotrode is required to ultrasonically weld up to five layers of nonwoven PET fabric.

Figure 8:
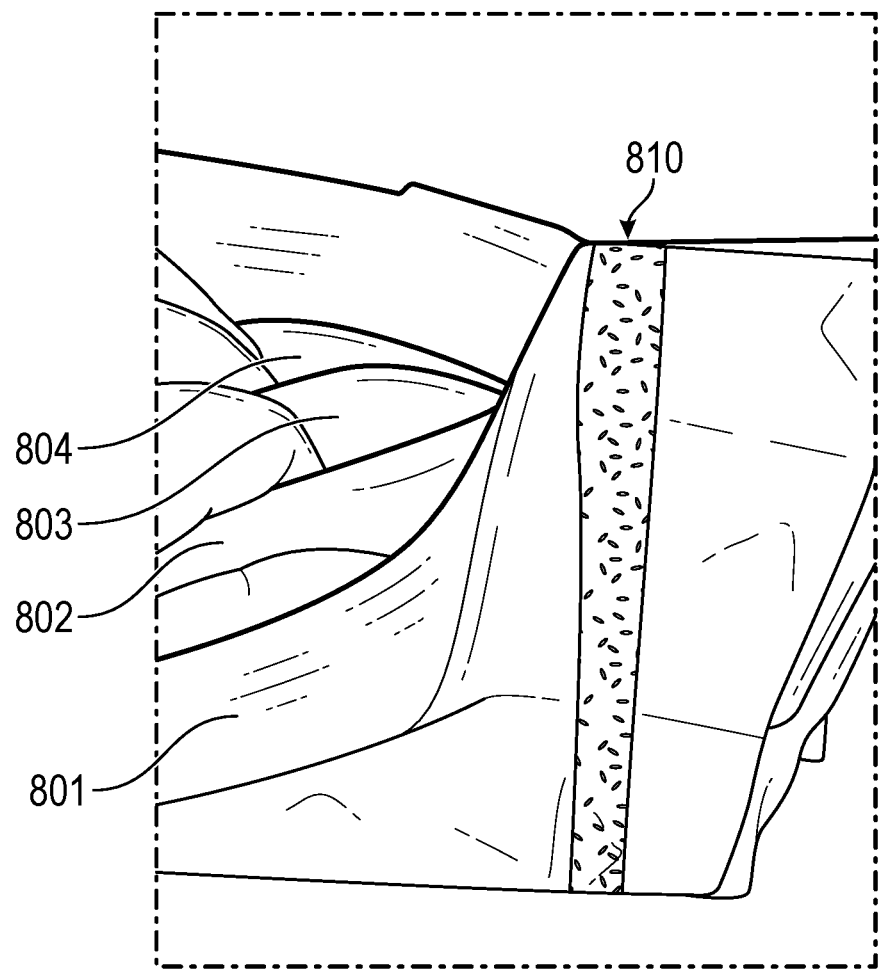
FIG. 8 is an exemplary image of five layers of nonwoven PET fabric that have been ultrasonically welded using one or more sonotrodes operated with a frequency greater than or equal to 20 kHz and pressure greater than or equal to 2,500 N, in accordance with various embodiments.

FIG. 8 is an exemplary image 800 of five layers of nonwoven PET fabric that have been ultrasonically welded using one or more sonotrodes operated with a frequency greater than or equal to 20 kHz and pressure greater than or equal to 2,500 N, in accordance with various embodiments. As described above, ultrasonic welding is used to attach the handles and seal the seams of tote bags. In FIG. 8, layers 801, 802, 803, 804, and 805 are ultrasonically welded creating seam 810.

Figure 9:
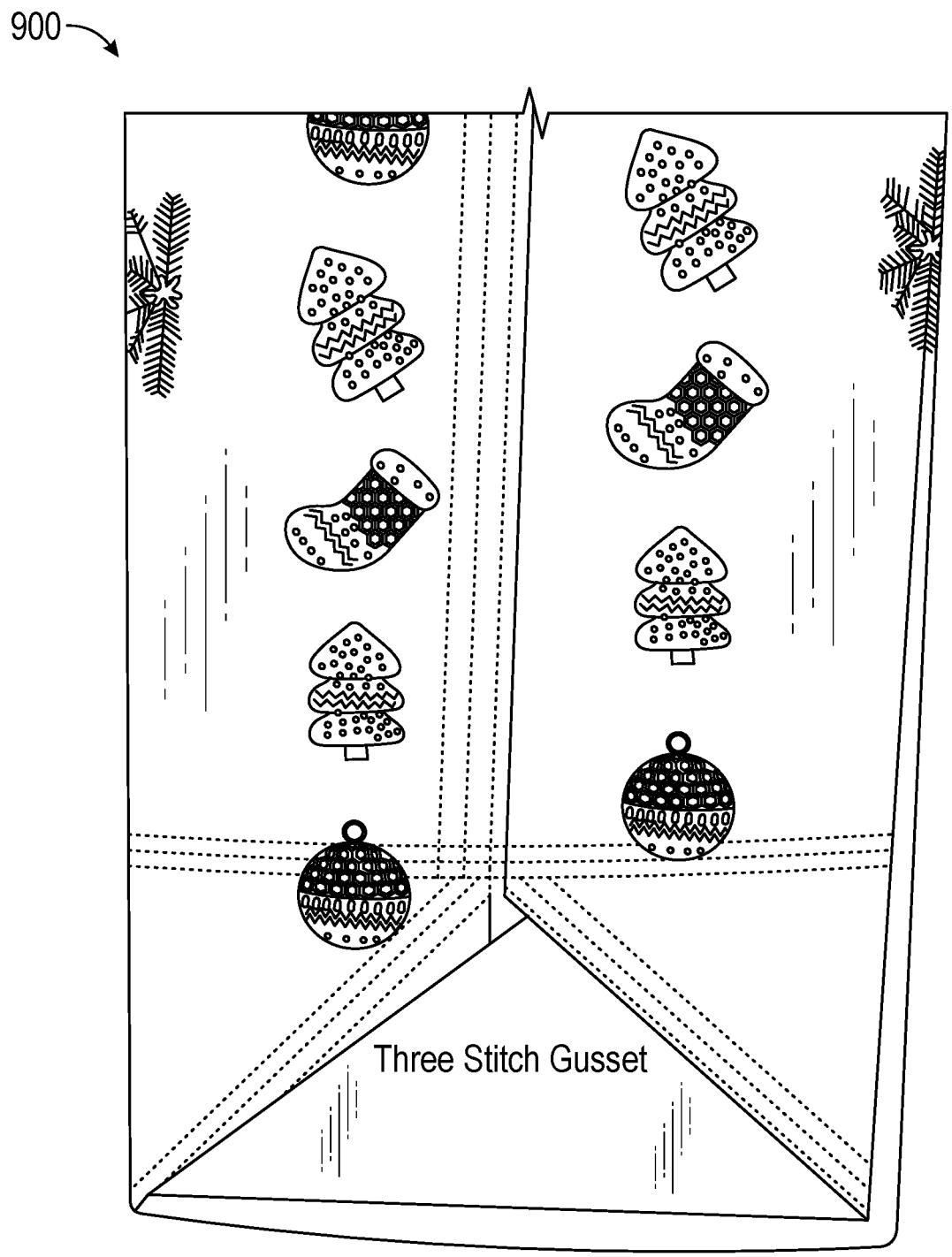
FIG. 9 is an exemplary image of a nonwoven PET fabric three stitch gusset that has been ultrasonically welded using one or more sonotrodes operated with a frequency greater than or equal to 20 kHz and pressure greater than or equal to 2,500 N, in accordance with various embodiments.

FIG. 9 is an exemplary image 900 of a nonwoven PET fabric three stitch gusset that has been ultrasonically welded using one or more sonotrodes operated with a frequency greater than or equal to 20 kHz and pressure greater than or equal to 2,500 N, in accordance with various embodiments.

Figure 10:
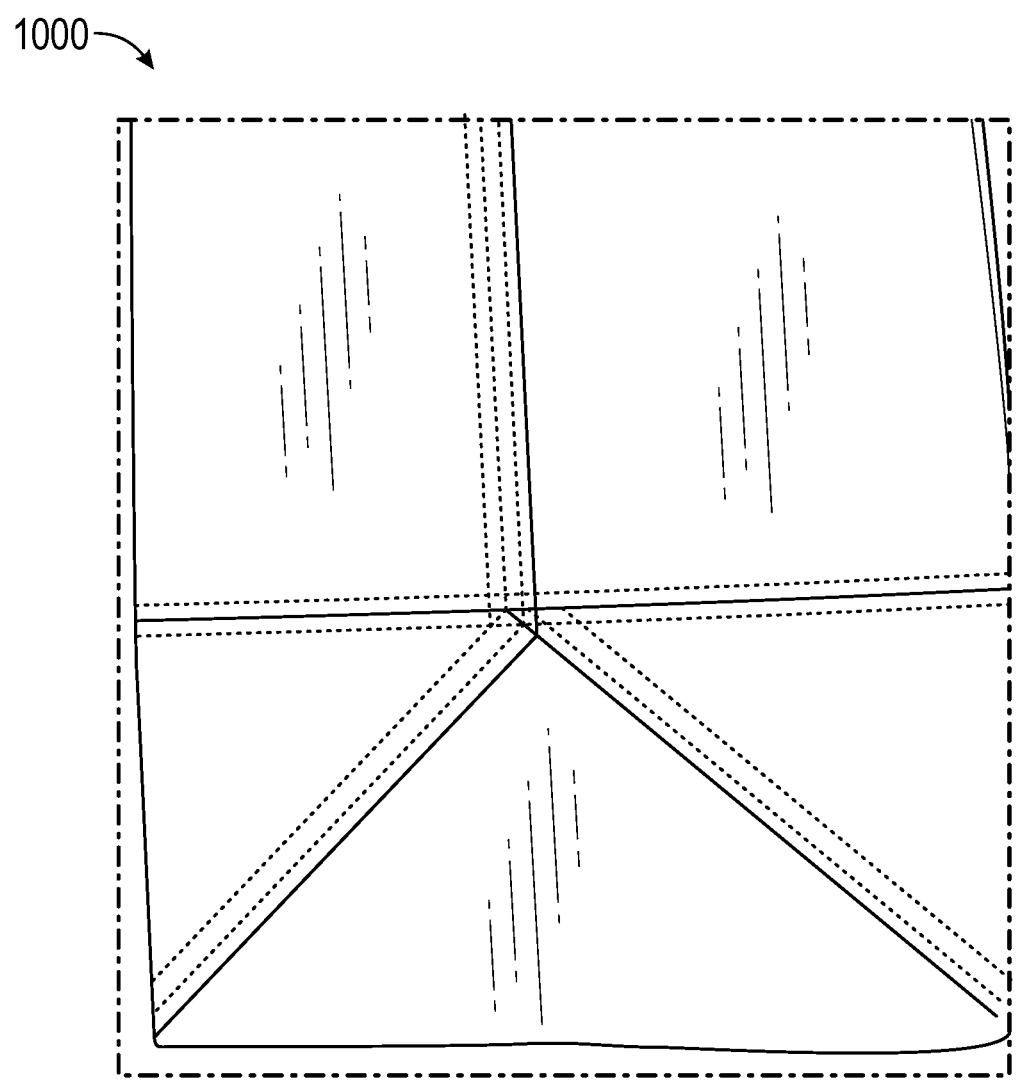
FIG. 10 is an exemplary image of a nonwoven PET fabric multi-layered gusset that has been ultrasonically welded using one or more sonotrodes operated with a frequency greater than or equal to 20 kHz and pressure greater than or equal to 2,500 N, in accordance with various embodiments.

FIG. 10 is an exemplary image 1000 of a nonwoven PET fabric multi-layered gusset that has been ultrasonically welded using one or more sonotrodes operated with a frequency greater than or equal to 20 kHz and pressure greater than or equal to 2,500 N, in accordance with various embodiments.

In various embodiments, nonwoven PET fabric used to make tote bags is laminated with a slot die laminator.

In various embodiments, nonwoven PET fabric used to make tote bags is embedded with one or more identifying chips or tags using an embedding device. The one or more identifying chips or tags can be, but are not limited to, barcode tags, QR tags, laser tags, radio frequency identification (RFID) chips, near-field communication chips or tags, or any other type of tag or device from which an identifier can be remotely read or scanned.

As described above, dye sublimation works well with nonwoven PET fabric. As a result, in various embodiments, promotional information is printed on nonwoven PET fabric using dye sublimation.

Figure 11:
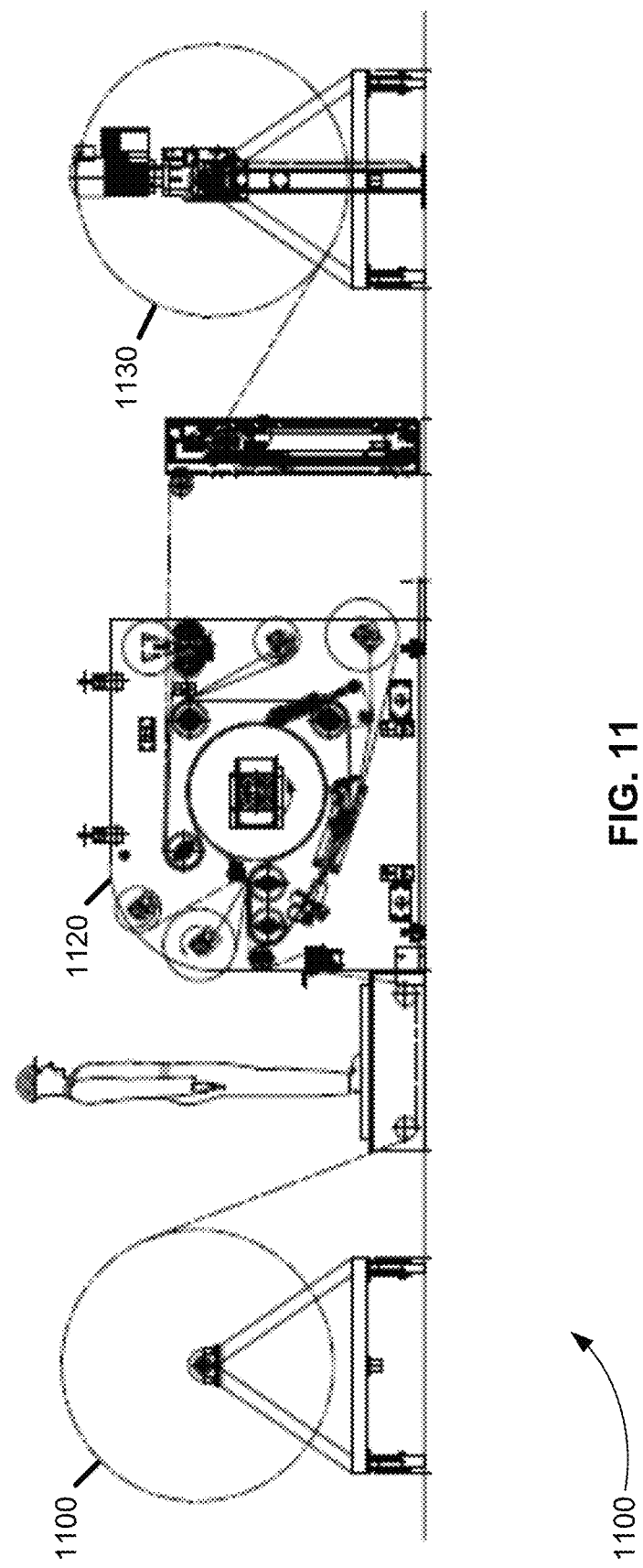
FIG. 11 is an exemplary diagram of a dye sublimation printer for printing promotional information on nonwoven PET fabric, in accordance with various embodiments.

FIG. 11 is an exemplary diagram 1100 of a dye sublimation printer for printing promotional information on nonwoven PET fabric, in accordance with various embodiments. Blank roll 1110 of PET fabric is fed into dye sublimation printer 1120 producing printed roll 1130 of nonwoven PET fabric.

In various alternative embodiments, promotional information is printed on nonwoven PET fabric using silkscreening or flexographic printing.

In various embodiments, promotional information is printed to a film that is laminated to a nonwoven PET fabric substrate. The film is, for example, biaxially oriented polypropylene (BOPP) film (40-70 gauge). Promotional information is reverse printed on the BOPP film using an ultraviolet (UV) printer or flexographic printer. Four different pigmented inks—Cyan (C), Magenta (M), Yellow (Y), and Black (K) in addition to White (W), or CMYK+W, can be used in flexographic printing, for example. The nonwoven PET fabric with laminated BOPP film is manufactured into a reusable tote bag with handles using an ultrasonic tote bag making machine with one or more sonotrodes operated with a frequency greater than or equal to 20 kHz and pressure greater than or equal to 2,500 N.

Figure 2:
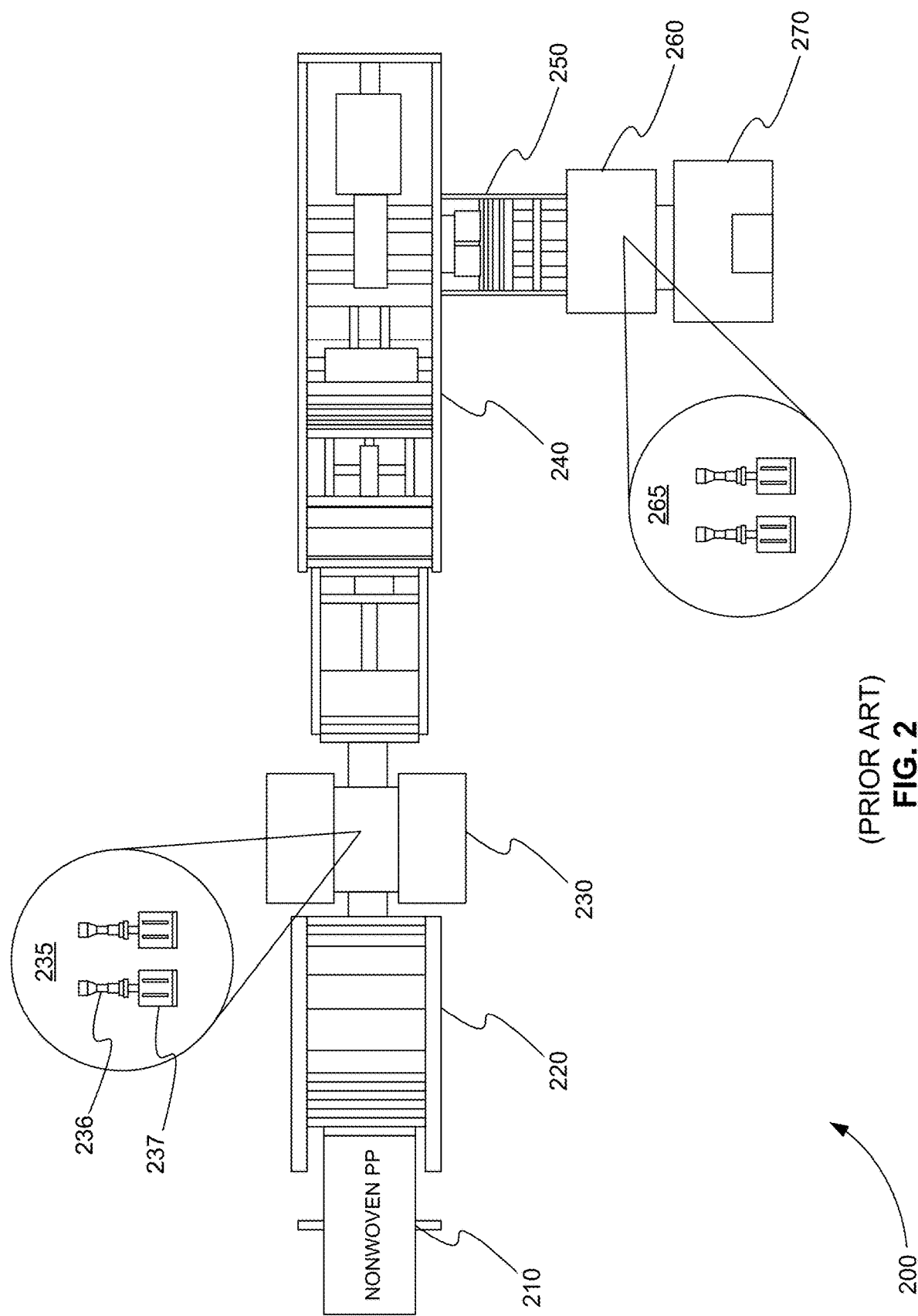
FIG. 2 is an exemplary top view diagram of an ultrasonic tote bag making machine that is used to cut, fold, and weld nonwoven polypropylene (PP) fabric.

In an alternative embodiment, promotional information is printed to a film that is laminated to a nonwoven PP fabric substrate rather than a nonwoven PET fabric substrate to further reduce the cost. The film is, for example, BOPP film (40-70 gauge). The BOPP film is bonded to the nonwoven PP fabric substrate (80-100 gsm) using an extrusion laminator and polyethylene (PE) resin. Again, promotional information is reverse printed on the BOPP film using an ultraviolet (UV) printer or flexographic printer. Four different pigmented inks—Cyan (C), Magenta (M), Yellow (Y), and Black (K) in addition to White (W), or CMYK+W, can be used in flexographic printing, for example. The nonwoven PP fabric with laminated BOPP film is manufactured into a reusable tote bag with handles using an ultrasonic tote bag making machine as shown in FIG. 2.

Apparatus for Manufacturing a Nonwoven PET Fabric Tote Bag

Figure 12:
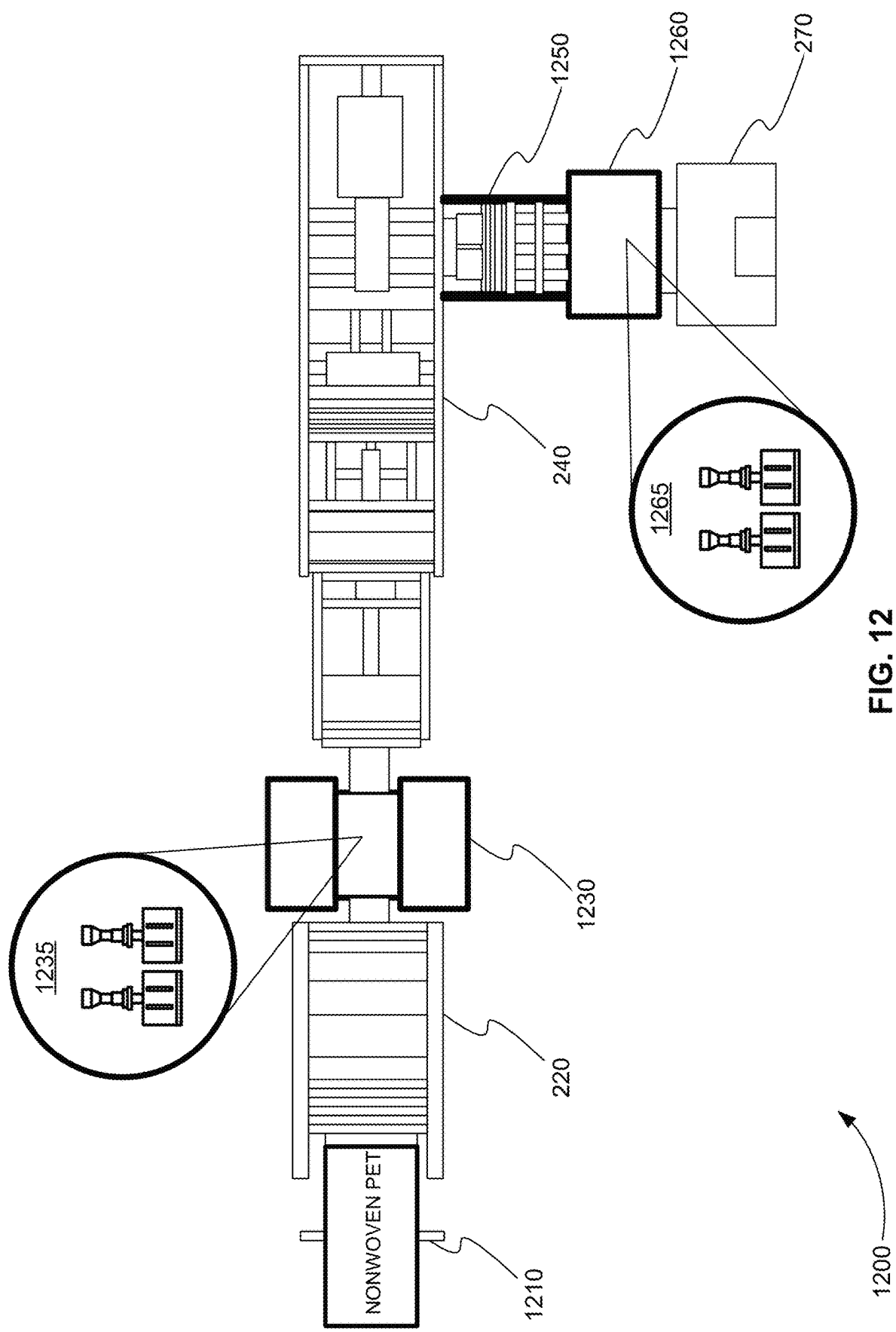
FIG. 12 is an exemplary top view diagram of an ultrasonic tote bag manufacturing machine that is used to manufacture tote bags from nonwoven PET fabric, in accordance with various embodiments.

FIG. 12 is an exemplary top view diagram 1200 of an ultrasonic tote bag manufacturing machine that is used to manufacture tote bags from nonwoven PET fabric, in accordance with various embodiments. Apparatus of the ultrasonic tote bag manufacturing machine of FIG. 12 includes bag forming device 1250 and ultrasonic bag welding device 1260.

Bag forming device 1250 forms at least one piece of nonwoven PET fabric into at least one tote bag. Again, tote bags can be formed into side gusset tote bags, flat tote bags, or bottom gusset tote bags, for example. Ultrasonic bag welding device 1260 then ultrasonically welds at least one seam of the at least one tote bag. Ultrasonic bag welding device 1260 uses at least one sonotrode 1265 operated to produce a frequency greater than or equal to 20 kHz and pressure greater than or equal to 2,500 N. Collecting device 270, for example, collects each welded and finished tote bag.

At least one sonotrode 1265 is operated using a control computer (not shown). The control computer can be a controller, a microprocessor, the computer system of FIG. 3, or any device capable of sending and receiving control signals and processing data. In various embodiments, the control computer can be the control computer of mainframe 240.

As shown in FIG. 12, bag forming device 1250 receives the at least one piece of nonwoven PET fabric from mainframe 240. As in FIG. 2, mainframe 240 of FIG. 12 stores and can fold the pieces of nonwoven PET fabric meant for tote bag manufacture. Mainframe 240 receives one or more pieces of nonwoven PET fabric for each tote bag from handle forming and sealing device 1230.

Handle forming and sealing device 1230 folds and then attaches two handles to the one or more pieces of nonwoven PET fabric for each tote bag. Handle forming and sealing device 1230 folds and attaches the handles to the one or more pieces of nonwoven PET fabric for each tote bag using one or more sonotrodes 1235 that weld each handle to each tote bag. Each of one or more sonotrodes 1235 is also operated to melt the nonwoven PET fabric by producing a frequency greater than or equal to 20 kHz and pressure greater than or equal to 2,500 N.

Handle forming and sealing device 1230 receives the one or more pieces of nonwoven PET fabric for each tote bag from feeding device 220. Feeding device 220 feeds and cuts the one or more pieces of nonwoven PET fabric for each tote bag from nonwoven PET fabric roll 1210. In various embodiments, precut one or more pieces of nonwoven PET fabric for each tote bag can be fed into feeding device 220, for example.

As described above, one advantage of nonwoven PET fabric is that it allows high-quality promotional information, such as images, to be printed directly on the nonwoven PET fabric.

In various embodiments, a dye sublimation printer, a silkscreen printer, or a flexographic printer (not shown) is used to print an image on the at least one piece of the nonwoven PET fabric used for each tote bag. The dye sublimation printer may be a printer like the one shown in FIG. 11 that prints to nonwoven PET fabric roll 1210 of FIG. 12 before nonwoven PET fabric roll 1210 is fed into feeding device 220. The dye sublimation printer may also be a printer that prints to at least one piece of the nonwoven PET fabric sometime after nonwoven PET fabric roll 1210 is fed into feeding device 220.

In various embodiments, the at least one piece of the nonwoven PET fabric includes recycled plastic.

In various embodiments, the at least one piece of nonwoven PET fabric includes a BOPP film laminated to the at least one piece of nonwoven PET fabric. As described above, high-quality promotional information, such as an image, is printed on the on BOPP film rather than nonwoven PET fabric. For example, an ultraviolet (UV) printer or a flexographic printer prints an image on the BOPP film of the at least one piece of the nonwoven PET fabric.

Method for Manufacturing a Nonwoven PET Fabric Tote Bag

Figure 13:
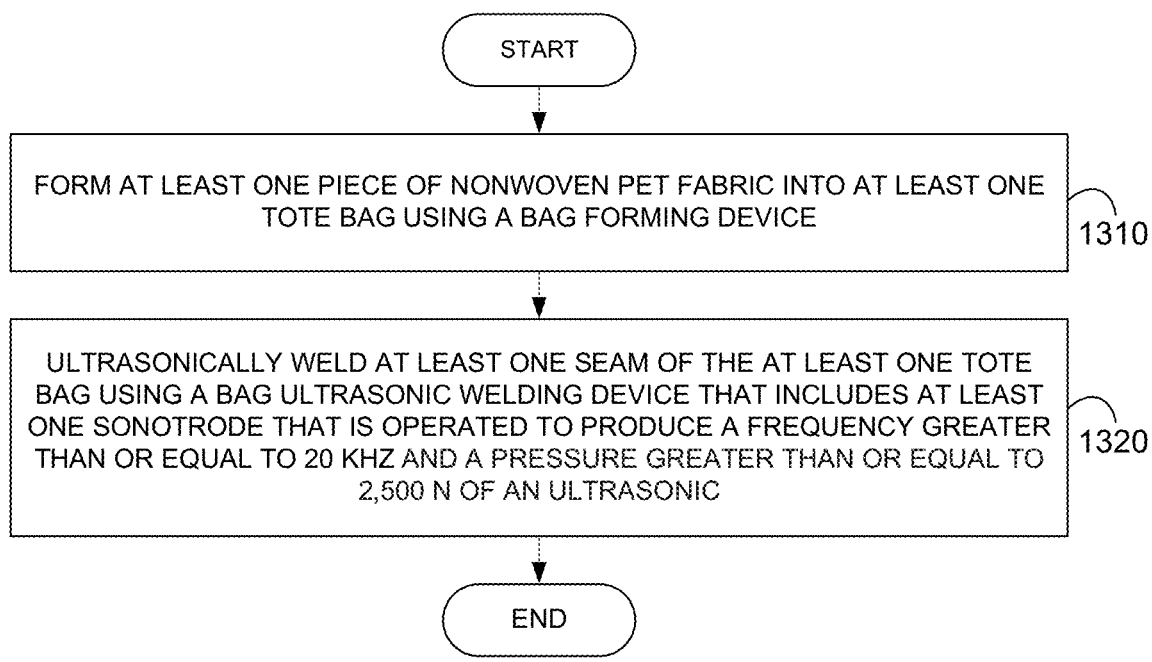
FIG. 13 is a flowchart showing a method for manufacturing tote bags from nonwoven PET fabric, in accordance with various embodiments.

FIG. 13 is a flowchart showing a method 1300 for manufacturing tote bags from nonwoven PET fabric, in accordance with various embodiments.

In step 1310 of method 1300, at least one piece of nonwoven PET fabric is formed into at least one tote bag using a bag forming device.

In step 1320, at least one seam of the at least one tote bag is ultrasonically welded using an ultrasonic bag welding device. The ultrasonic bag welding device includes at least one sonotrode that is operated to produce a frequency greater than or equal to 20 kHz and pressure greater than or equal to 2,500 N of an ultrasonic.

Apparatus for Manufacturing Tote Bags in which BOPP Film is Printed First

Figure 14:
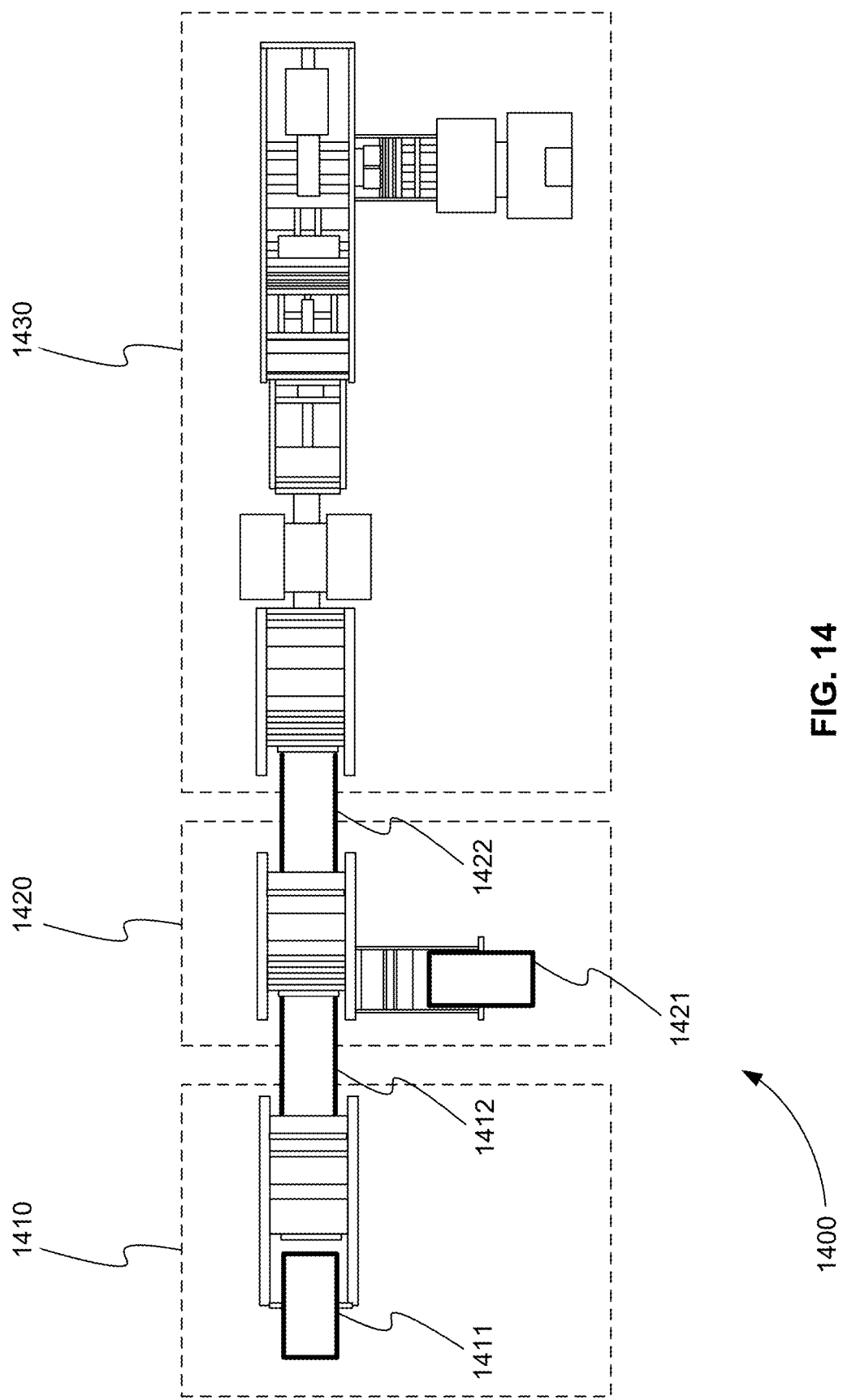
FIG. 14 is an exemplary diagram of an apparatus for manufacturing full-color graphic printed tote bags made from BOPP film laminated to nonwoven PP or PET fabric in one process in which at least one full-color graphic is printed on the BOPP film before lamination, in accordance with various embodiments.

FIG. 14 is an exemplary diagram 1400 of an apparatus for manufacturing full-color graphic printed tote bags made from BOPP film laminated to nonwoven PP or PET fabric in which at least one full-color graphic is printed on the BOPP film before lamination, in accordance with various embodiments. The apparatus includes printer 1410, laminator 1420, and ultrasonic bag welding device 1430.

Printer 1410 receives BOPP film from roll of BOPP film 1411 and prints at least one full-color graphic on the BOPP film for each of a plurality of tote bags.

Laminator 1420 receives printed BOPP film 1412 from printer 1410 as printed BOPP film 1421 is being printed. Laminator 1420 receives nonwoven PP or PET fabric from roll of nonwoven PP or PET fabric 1421. Laminator 1420 laminates printed BOPP film 1412 to the nonwoven PP or PET fabric as printed BOPP film 1412 is received from printer 1410.

In FIG. 14, laminator 1420 is shown as receiving printed BOPP film 1412 from printer 1410 as printed BOPP film 1421 is being printed. However, in various embodiments, printer 1410 creates a roll of printed BOPP film 1412, which is moved to laminator 1420 and then fed into laminator 1420. The roll of printed BOPP film 1412 can be moved to laminator 1420 manually or by machine.

Ultrasonic bag welding device 1430 receives printed BOPP film laminated to nonwoven PP or PET fabric 1422 from laminator 1420 as printed BOPP film laminated to nonwoven PP or PET fabric 1422 is being laminated. Ultrasonic bag welding device 1430 produces a finished version of each of the plurality of tote bags. Specifically, ultrasonic bag welding device 1430 cuts printed BOPP film laminated to nonwoven PP or PET fabric 1422 for each tote bag and cuts part of the printed BOPP film laminated to nonwoven PP or PET fabric 1422 for handles for each tote bag. Ultrasonic bag welding device 1430 further ultrasonically welds the handles to each tote bag, forms each tote bag, and ultrasonically welds together seams for each tote bag.

In FIG. 14, ultrasonic bag welding device 1430 is shown as receiving printed BOPP film laminated to nonwoven PP or PET fabric 1422 from laminator 1420 as it is being laminated. However, in various embodiments, laminator 1420 creates a roll of printed BOPP film laminated to nonwoven PP or PET fabric 1422, which is moved to ultrasonic bag welding device 1430 and then fed into ultrasonic bag welding device 1430. The roll of printed BOPP film laminated to nonwoven PP or PET fabric 1422 can be moved to ultrasonic bag welding device 1430 manually or by machine.

In various embodiments, nonwoven PP or PET fabric from roll of nonwoven PP or PET fabric 1421 is spunbond nonwoven PP or PET fabric.

In various embodiments, printer 1410, laminator 1420 and ultrasonic bag welding device 1430 are operated to produce a finished version of each of the plurality of tote bags at a rate of at least one tote bag per second.

In various embodiments, roll of BOPP film 1411 is at least 700 meters long.

In various embodiments, the ultrasonic bag welding device further folds the handles and sides for each tote bag before ultrasonically welding the handles to each tote bag and ultrasonically welding together seams for each tote bag.

In various embodiments, if the nonwoven PP or PET fabric is PET fabric, ultrasonic bag welding device 1430 performs the steps of ultrasonically welding the handles to each tote bag and ultrasonically welding together seams for each tote bag by using at least one sonotrode operated to produce a frequency greater than or equal to 20 kHz and a pressure greater than or equal to 2,500 N.

In various embodiments, printer 1410 is a flexographic printer.

Method for Manufacturing Tote Bags in which BOPP Film is Printed First

Figure 15:
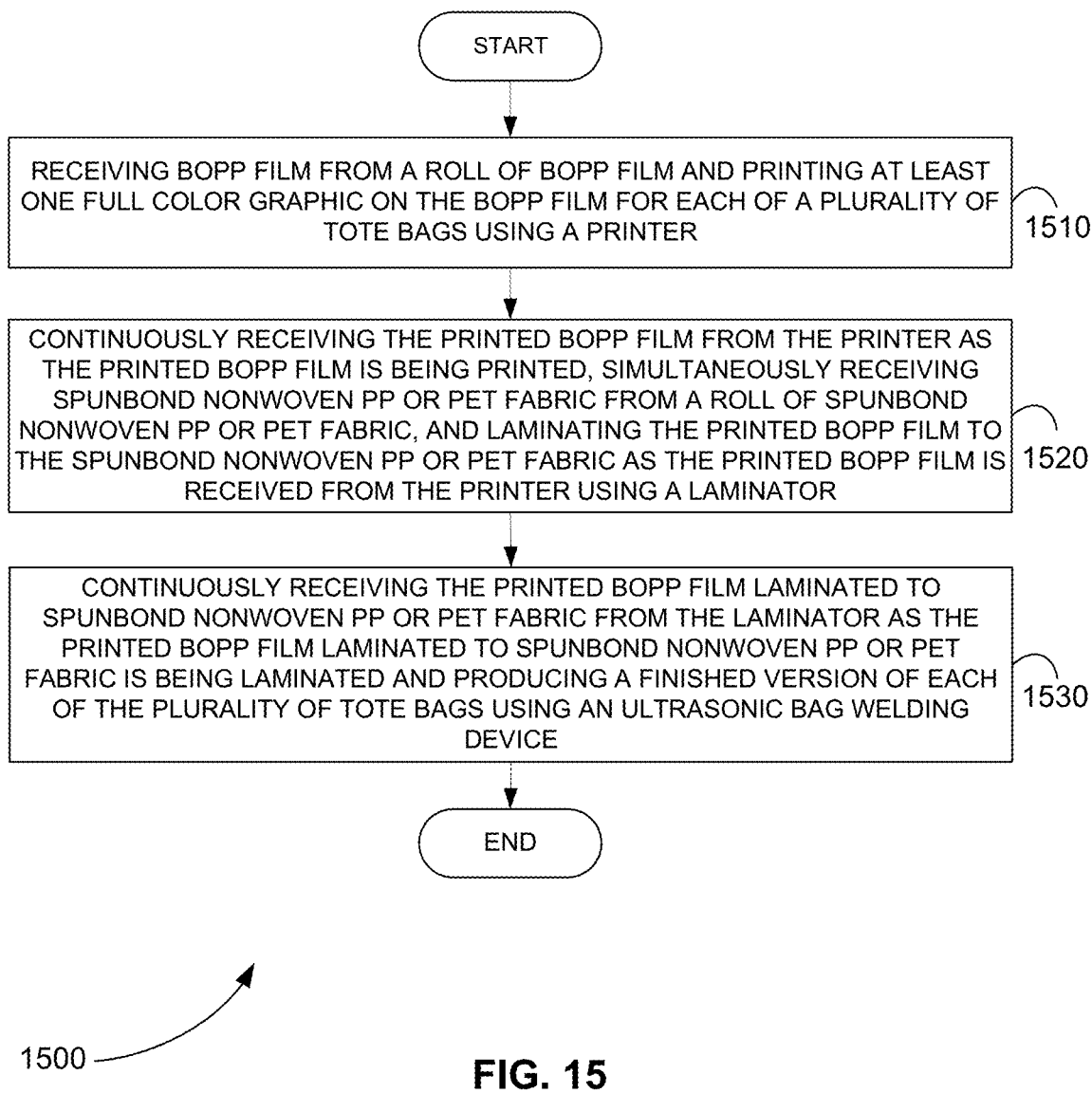
FIG. 15 is a flowchart showing a method for manufacturing full-color graphic printed tote bags made from BOPP film laminated to nonwoven PP or PET fabric in one process in which at least one full-color graphic is printed on the BOPP film before lamination, in accordance with various embodiments.

FIG. 15 is a flowchart showing a method 1500 for manufacturing full-color graphic printed tote bags made from BOPP film laminated to nonwoven PP or PET fabric in one process in which at least one full-color graphic is printed on the BOPP film before lamination, in accordance with various embodiments.

In step 1510 of method 1500, BOPP film is received from a roll of BOPP film and at least one full-color graphic is printed on the BOPP film for each of a plurality of tote bags using a printer.

In step 1520, the printed BOPP film is received from the printer as the printed BOPP film is being printed, nonwoven PP or PET fabric is received from a roll of nonwoven PP or PET fabric, and the printed BOPP film is laminated to the nonwoven PP or PET fabric as the printed BOPP film is received from the printer using a laminator.

In step 1530, the printed BOPP film laminated to nonwoven PP or PET fabric is received from the laminator as the printed BOPP film laminated to nonwoven PP or PET fabric is being laminated. A finished version of each of the plurality of tote bags is produced using an ultrasonic bag welding device. Specifically, the finished version of each of the plurality of tote bags is produced by cutting the printed BOPP film laminated to nonwoven PP or PET fabric for each tote bag, cutting part of the printed BOPP film laminated to nonwoven PP or PET fabric for handles for each tote bag, ultrasonically welding the handles to each tote bag, forming each tote bag, and ultrasonically welding together seams for each tote bag.

Apparatus for Manufacturing Tote Bags in which BOPP Film is Laminated First

Figure 16:
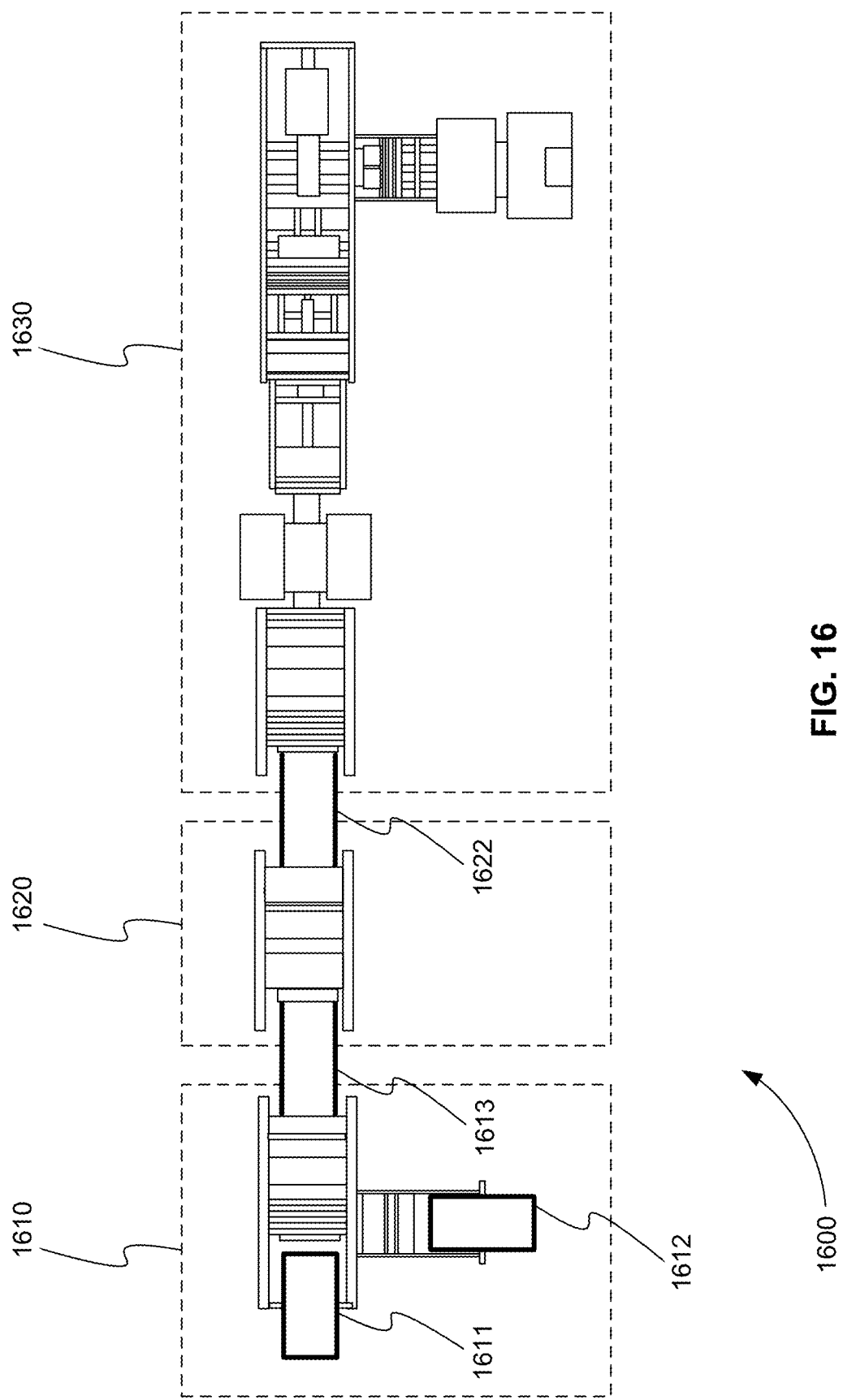
FIG. 16 is an exemplary diagram of another apparatus for manufacturing full-color graphic printed tote bags made from BOPP film laminated to nonwoven PP or PET fabric in one process in which at least one full-color graphic is printed on the BOPP film after lamination, in accordance with various embodiments.

FIG. 16 is an exemplary diagram 1600 of another apparatus for manufacturing full-color graphic printed tote bags made from BOPP film laminated to nonwoven PP or PET fabric in one process in which at least one full-color graphic is printed on the BOPP film after lamination, in accordance with various embodiments. The apparatus includes laminator 1610, printer 1620, and ultrasonic bag welding device 1630.

Laminator 1610 receives BOPP film from roll of BOPP film 1611. Laminator 1610 receives nonwoven PP or PET fabric from roll of nonwoven PP or PET fabric 1612. Laminator 1610 laminates the BOPP film to the nonwoven PP or PET fabric as the BOPP film is received from roll of BOPP film 1611.

Printer 1620 receives BOPP film laminated to nonwoven PP or PET fabric 1613 from laminator 1610 and prints at least one full-color graphic on BOPP film laminated to nonwoven PP or PET fabric 1613 as the BOPP film is laminated to the nonwoven PP or PET fabric for each of a plurality of tote bags.

In FIG. 16, printer 1620 is shown as receiving BOPP film laminated to nonwoven PP or PET fabric 1613 from laminator 1610 as it is being laminated. However, in various embodiments, laminator 1610 creates a roll of BOPP film laminated to nonwoven PP or PET fabric 1613, which is moved to printer 1620 and then fed into printer 1620. The roll of BOPP film laminated to nonwoven PP or PET fabric 1613 can be moved to printer 1620 manually or by machine.

Ultrasonic bag welding device 1630 receives printed BOPP film laminated to nonwoven PP or PET fabric 1622 from printer 1620 as printed BOPP film laminated to nonwoven PP or PET fabric 1622 is being printed. Ultrasonic bag welding device 1630 produces a finished version of each of the plurality of tote bags. Specifically, ultrasonic bag welding device 1630 cuts printed BOPP film laminated to nonwoven PP or PET fabric 1622 for each tote bag and cuts part of printed BOPP film laminated to nonwoven PP or PET fabric 1622 for handles for each tote bag. Ultrasonic bag welding device 1630 further ultrasonically welds the handles to each tote bag, forms each tote bag, and ultrasonically welds together seams for each tote bag.

In FIG. 16, ultrasonic bag welding device 1630 is shown as receiving printed BOPP film laminated to nonwoven PP or PET fabric 1622 from printer 1620 as it is being printed. However, in various embodiments, from printer 1620 creates a roll of printed BOPP film laminated to nonwoven PP or PET fabric 1622, which is moved to ultrasonic bag welding device 1630 and then fed into ultrasonic bag welding device 1630. The roll of printed BOPP film laminated to nonwoven PP or PET fabric 1622 can be moved to ultrasonic bag welding device 1630 manually or by machine.

Method for Manufacturing Tote Bags in which BOPP Film is Laminated First

Figure 17:
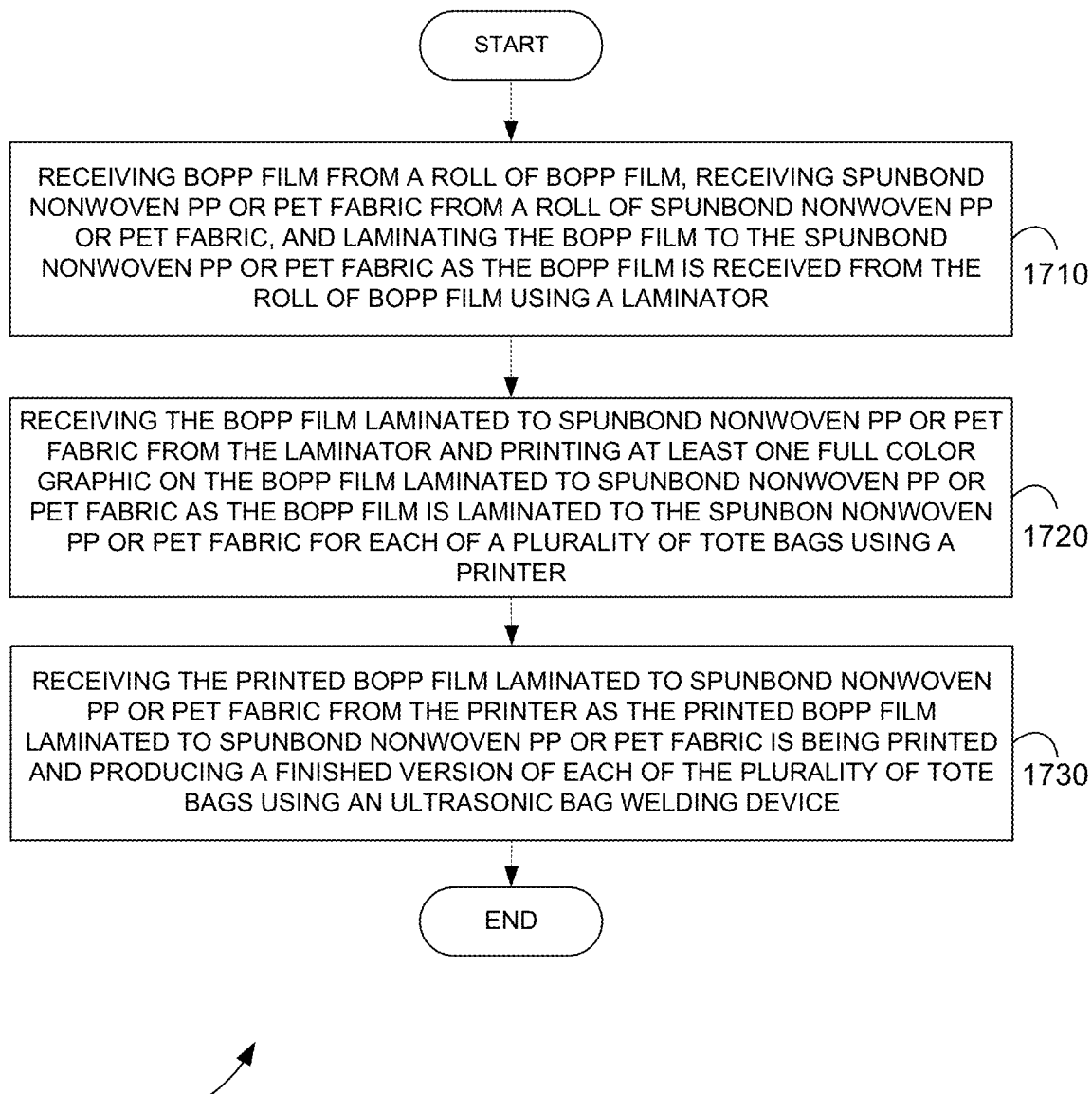
FIG. 17 is a flowchart showing another method for manufacturing full-color graphic printed tote bags made from BOPP film laminated to nonwoven PP or PET fabric in which at least one full-color graphic is printed on the BOPP film after lamination, in accordance with various embodiments.

FIG. 17 is a flowchart showing another method 1700 for manufacturing full-color graphic printed tote bags made from BOPP film laminated to nonwoven PP or PET fabric in one process in which at least one full-color graphic is printed on the BOPP film before lamination, in accordance with various embodiments.

In step 1710 of method 1500, BOPP film is received from a roll of BOPP film. Nonwoven PP or PET fabric is received from a roll of nonwoven PP or PET fabric. The BOPP film is laminated to the nonwoven PP or PET fabric as the BOPP film is received from the roll of BOPP film using a laminator.

In step 1720, the BOPP film laminated to nonwoven PP or PET fabric is received from the laminator. At least one full-color graphic is printed on the BOPP film laminated to nonwoven PP or PET fabric as the BOPP film is laminated to the nonwoven PP or PET fabric for each of a plurality of tote bags using a printer.

In step 1730, the printed BOPP film laminated to nonwoven PP or PET fabric is received from the printer as the printed BOPP film laminated to nonwoven PP or PET fabric is being printed. A finished version of each of the plurality of tote bags is produced using an ultrasonic bag welding device. Specifically, the finished version of each of the plurality of tote bags is produced by cutting the printed BOPP film laminated to nonwoven PP or PET fabric for each tote bag, cutting part of the printed BOPP film laminated to nonwoven PP or PET fabric for handles for each tote bag, ultrasonically welding the handles to each tote bag, forming each tote bag, and ultrasonically welding together seams for each tote bag.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. Apparatus for manufacturing tote bags from nonwoven polyethylene terephthalate (PET) fabric, comprising:
   a bag forming device that forms at least one piece of nonwoven PET fabric into at least one tote bag;
   an ultrasonic bag welding device that ultrasonically welds at least one seam of the at least one tote bag using at least one sonotrode operated to produce a frequency greater than or equal to 20 kHz and pressure greater than or equal to 2,500 N.

2. The apparatus of claim 1, further comprising a dye sublimation printer that prints an image on the at least one piece of the nonwoven PET fabric.

3. The apparatus of claim 1, further comprising a silkscreen printer that prints an image on the at least one piece of the nonwoven PET fabric.

4. The apparatus of claim 1, further comprising a flexographic printer that prints an image on the at least one piece of the nonwoven PET fabric.

5. The apparatus of claim 1, the at least one piece of the nonwoven PET fabric includes recycled plastic.

6. The apparatus of claim 1, wherein the at least one piece of nonwoven PET fabric includes a biaxially oriented polypropylene (BOPP) film laminated to the at least one piece of nonwoven PET fabric.

7. The apparatus of claim 6, further comprising an ultraviolet (UV) printer that prints an image on the BOPP film of the at least one piece of the nonwoven PET fabric.

8. The apparatus of claim 1, further comprising a flexographic printer that prints an image on the BOPP film of the at least one piece of the nonwoven PET fabric.

9. Apparatus for manufacturing full-color graphic printed tote bags made from biaxially oriented polypropylene (BOPP) film laminated to spunbond nonwoven polypropylene (PP) or polyethylene terephthalate (PET) fabric in one process in which at least one full-color graphic is printed on the BOPP film before lamination, comprising:
   a printer that receives BOPP film from a roll of BOPP film and prints at least one full-color graphic on the BOPP film for each of a plurality of tote bags;
   a laminator that receives the printed BOPP film from the printer as the printed BOPP film is being printed, receives nonwoven PP or PET fabric from a roll of nonwoven PP or PET fabric, and laminates the printed BOPP film to the nonwoven PP or PET fabric as the printed BOPP film is received from the printer; and an ultrasonic bag welding device that receives the printed BOPP film laminated to nonwoven PP or PET fabric from the laminator as the printed BOPP film laminated to nonwoven PP or PET fabric is being laminated, and that produces a finished version of each of the plurality of tote bags by
cutting the printed BOPP film laminated to nonwoven PP or PET fabric for the each tote bag,
cutting part of the printed BOPP film laminated to nonwoven PP or PET fabric for handles for the each tote bag,
ultrasonically welding the handles to the each tote bag, forming the each tote bag, and
ultrasonically welding together seams for the each tote bag.

10. The apparatus of claim 9, wherein the nonwoven PP or PET fabric is spunbond nonwoven PP or PET fabric.

11. The apparatus of claim 9, wherein the printer, the laminator and the ultrasonic bag welding device are operated to produce a finished version of each of the plurality of tote bags at a rate of at least one tote bag per second.

12. The apparatus of claim 9, wherein the roll of BOPP film is at least 700 meters long.

13. The apparatus of claim 9, wherein the ultrasonic bag welding device further folds the handles and sides for each tote bag before ultrasonically welding the handles to the each tote bag and ultrasonically welding together seams for the each tote bag.

14. The apparatus of claim 9, wherein if the nonwoven PP or PET fabric is PET fabric, the ultrasonic bag welding device performs the steps of ultrasonically welding the handles to the each tote bag and ultrasonically welding together seams for the each tote bag by using at least one sonotrode operated to produce a frequency greater than or equal to 20 kHz and a pressure greater than or equal to 2,500 N.

15. The apparatus of claim 9, wherein the printer comprises a flexographic printer.

16. Apparatus for manufacturing full-color graphic printed tote bags made from biaxially oriented polypropylene (BOPP) film laminated to spunbond nonwoven polypropylene (PP) or polyethylene terephthalate (PET) fabric in one process in which at least one full-color graphic is printed on the BOPP film after lamination, comprising:
a laminator that receives BOPP film from a roll of BOPP film, receives nonwoven PP or PET fabric from a roll of nonwoven PP or PET fabric, and laminates the BOPP film to the nonwoven PP or PET fabric as the BOPP film is received from the roll of BOPP film;
a printer that receives the BOPP film laminated to nonwoven PP or PET fabric from the laminator and prints at least one full-color graphic on the BOPP film laminated to nonwoven PP or PET fabric as the BOPP film is laminated to the nonwoven PP or PET fabric for each of a plurality of tote bags; and
an ultrasonic bag welding device that receives the printed BOPP film laminated to nonwoven PP or PET fabric from the printer as the printed BOPP film laminated to nonwoven PP or PET fabric is being printed, and that produces a finished version of each of the plurality of tote bags by
cutting the printed BOPP film laminated to nonwoven PP or PET fabric for the each tote bag,
cutting part of the printed BOPP film laminated to nonwoven PP or PET fabric for handles for the each tote bag,
ultrasonically welding the handles to the each tote bag, forming the each tote bag, and
ultrasonically welding together seams for the each tote bag.

17. The apparatus of claim 16, wherein the laminator, the printer, and the ultrasonic bag welding device are operated to produce a finished version of each of the plurality of tote bags at a rate of at least one tote bag per second.

18. The apparatus of claim 16, wherein the roll of BOPP film is at least 700 meters long.

19. The apparatus of claim 16, wherein the ultrasonic bag welding device further folds the handles and sides for each tote bag before ultrasonically welding the handles to the each tote bag and ultrasonically welding together seams for the each tote bag.

20. The apparatus of claim 16, wherein if the nonwoven PP or PET fabric is PET fabric, the ultrasonic bag welding device performs the steps of ultrasonically welding the handles to the each tote bag and ultrasonically welding together seams for the each tote bag by using at least one sonotrode operated to produce a frequency greater than or equal to 20 kHz and a pressure greater than or equal to 2,500 N.

* * * * *